United States Patent
Chen et al.

(10) Patent No.: US 11,470,291 B2
(45) Date of Patent: Oct. 11, 2022

(54) PROJECTOR AND FOCAL LENGTH ADJUSTING METHOD THEREOF

(71) Applicant: Coretronic Corporation, Hsin-Chu (TW)

(72) Inventors: Te-Tang Chen, Hsin-Chu (TW); Chun-Lung Yen, Hsin-Chu (TW); Wen-Yen Chung, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 1 day.

(21) Appl. No.: 16/737,851

(22) Filed: Jan. 8, 2020

(65) Prior Publication Data
US 2020/0228766 A1 Jul. 16, 2020

(30) Foreign Application Priority Data

Jan. 16, 2019 (CN) .......................... 201910038922.4

(51) Int. Cl.
*H04N 9/31* (2006.01)

(52) U.S. Cl.
CPC ......... *H04N 9/3185* (2013.01); *H04N 9/3144* (2013.01)

(58) Field of Classification Search
CPC ............................ H04N 9/3185; H04N 9/3144
USPC .......................................................... 348/745
See application file for complete search history.

(56) References Cited

U.S. PATENT DOCUMENTS

| 6,211,852 | B1 | 4/2001 | Oono et al. | |
|---|---|---|---|---|
| 8,550,635 | B2 * | 10/2013 | Kotani | G03B 21/14 |
| | | | | 353/94 |
| 2007/0291238 | A1 * | 12/2007 | Yanagisawa | H04N 9/3144 |
| | | | | 353/119 |
| 2011/0032489 | A1 * | 2/2011 | Kimoto | H04N 9/3144 |
| | | | | 353/56 |
| 2012/0038272 | A1 * | 2/2012 | De Castro | F21S 41/143 |
| | | | | 315/35 |

(Continued)

FOREIGN PATENT DOCUMENTS

| CN | 1755515 | 4/2006 |
|---|---|---|
| CN | 1991567 | 7/2007 |

(Continued)

OTHER PUBLICATIONS

"Office Action of China Counterpart Application", dated Mar. 25, 2021, p. 1-p. 9.

*Primary Examiner* — John W Miller
*Assistant Examiner* — Omer Khalid
(74) *Attorney, Agent, or Firm* — JCIPRNET

(57) ABSTRACT

A projector including a casing, a control system, an image assembly and at least one electric thermal heater is provided. The image assembly is coupled to and controlled by the control system. The electric thermal heater is coupled to and controlled by the control system. The control system is configured to activate the electric thermal heater to preheat the image assembly, such that the image assembly is warmed up to a cut-off temperature. Then, the control system is configured to switch off the electric thermal heater. Then the focal length of the image assembly is adjusted. A focal length adjusting method for the projector is further provided. The projector and the method may be used to avoid the thermal expansion of various elements, so as to avoid focal length shift.

14 Claims, 3 Drawing Sheets

(56) References Cited

U.S. PATENT DOCUMENTS

2012/0152778 A1* 6/2012 Lin .................. G03B 21/16
                                                206/320
2016/0295177 A1* 10/2016 Ko .................. H04N 9/3164

FOREIGN PATENT DOCUMENTS

| | | |
|---|---|---|
| CN | 101666967 | 3/2010 |
| CN | 103091951 | 5/2013 |
| CN | 104330946 | 2/2015 |
| CN | 106918978 | 7/2017 |
| CN | 108073018 | 5/2018 |
| CN | 207457685 | 6/2018 |
| CN | 209215846 | 8/2019 |
| JP | 2011209394 | 10/2011 |
| JP | 2013195490 | 9/2013 |
| KR | 100616090 | 8/2006 |

* cited by examiner

PROJECTOR AND FOCAL LENGTH ADJUSTING METHOD THEREOF

CROSS-REFERENCE TO RELATED APPLICATION

This application claims the priority benefit of China application serial no. 201910038922.4, filed on Jan. 16, 2019. The entirety of the above-mentioned patent application is hereby incorporated by reference herein and made a part of this specification.

BACKGROUND

Technical Field

The invention relates to a projector and a focal length adjusting method, and particularly relates to a projector and a focal length adjusting method may be used to mitigate the focal length shift.

Description of Related Art

Projector is used for generating images, and it is often used in case of film and/or presentation. In a projector, a light beam from a light source may be converted into an image beam by using a light valve of a projector and the image beam may be projected onto a screen or a wall through a projection lens to form an image.

As the working time of a projector continues, more and more heat is generated by the light beam from the light source of the projector. The heat may cause a thermal expansion of the light valve and the projection lens, and a focal length shift may be resulted. When the focal length is shifted to some extent, the image projected by the projection lens may be blurred and unclear, that is a thermal drift occurs. As such, the focal length of the projection lens may need to be manually adjusted.

A cooling equipment such as a thermoelectric cooling chip or a fan may be used to cool the projector down. When the projector works, the difference of the temperature of the light source and that of the projection lens may be minimized, so as to reduce the thermal expansion. Accordingly, the focal length shift may be mitigated. However, additional cooling chips or fans may not be preferable since they may cause an increase in manufacturing cost, noise and/or vibration.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projector and a focal length adjusting method. The projector and the focal length adjusting method may be used to mitigate the thermal expansion of the projector during operation, and may be used to avoid the focal length of the projector from shifting, so as to avoid a blurred or unclear image.

The invention provides a projector including a casing, a control system, an image assembly and at least one electric thermal heater. The image assembly is coupled to and controlled by the control system, and is at least partially disposed in the casing. The at least one electric thermal heater is coupled to and controlled by the control system, and is disposed in the casing. The control system activates the at least one electric thermal heater to preheat the image assembly and warm up the image assembly to a cut-off temperature. Then the control system switches off the at least one electric thermal heater and the focal length of the image assembly is adjusted.

The invention provides a focal length adjusting method for a projector. The projector includes an image assembly, and the image assembly is at least partially disposed in a casing. At least one electric thermal heater is disposed on the image assembly. A control system is coupled to and controls the image assembly and the at least one electric thermal heater. The focal length adjusting method includes powering on the projector. The control system is activated and configured to control the at least one electric thermal heater. The at least one electric thermal heater is activated to preheat the image assembly. In the focal length adjusting method, when the image assembly is warmed up to the cut-off temperature, the at least one electric thermal heater is controlled and switched off by the control system. When the image assembly is not warmed up to the cut-off temperature, the image assembly may be continuously heated. Then the focal length of the image assembly is adjusted to output an image.

Based on the above, after the projector is powered on, the at least one electric thermal heater is activated to preheat the image assembly to a cut-off temperature in a short period before the focal length is adjusted. Then the control system may be used to switched off the at least one electric thermal heater, and then the focal length of the image assembly is adjusted by way of a manual focusing and/or an automatic focusing. Meanwhile, the image assembly is continuously heated to an operating temperature. Compared to the room temperature, the cut-off temperature is closer to the operating temperature of the projector. Thus, with the heating in advance of focusing, the image assembly may suffer a smaller temperature change from the cut-off temperature to the operating temperature than the temperature change from the room temperature to the operating temperature. Therefore, the thermal expansion of the projector may be reduced and the focal length shift caused by the thermal expansion of the projector may also be avoided. Therefore, in the invention, with the projector being warmed up to the cut-off temperature within a short period before adjusting the focal length, the projector may be readily to operate more quickly, and a waiting period before focusing is reduced. Further, a focal length shift is mitigated.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
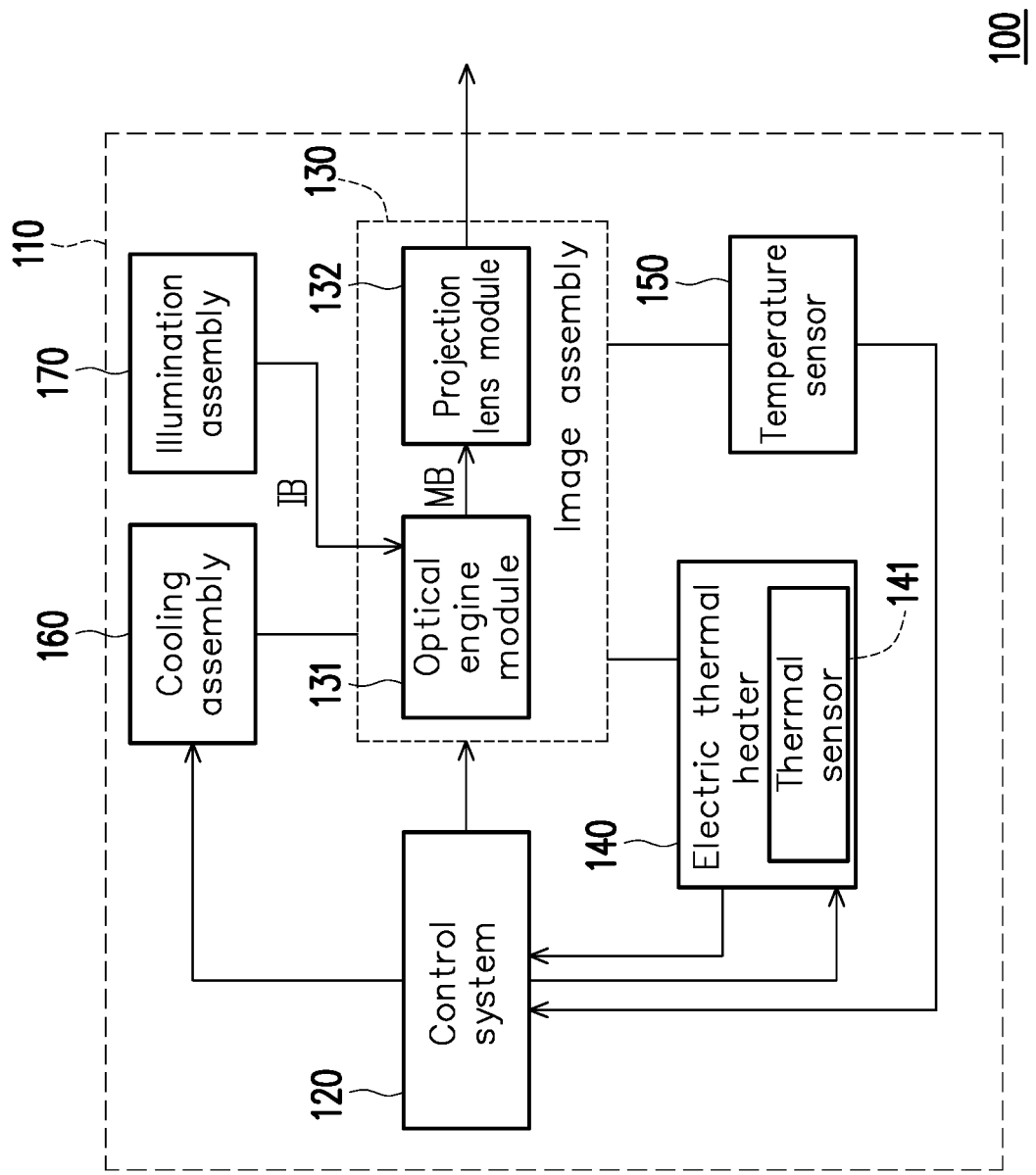
FIG. 1 is a schematic view of a projector according to an embodiment of the invention.

FIG. 1 is a schematic view of a projector according to an embodiment of the invention.

Referring to FIG. 1, the projector 100 of the embodiment includes a casing 110, a control system 120, an image assembly 130, at least one electric thermal heater 140 and an illumination assembly 170.

The casing 110 is, for example, made of a plastic material and has an accommodating space, which is mainly configured to accommodate various components. The control system 120, for example, includes a program processing unit installed in the casing 110 and an external remote control device. In detail, after the projector 100 is powered on, the program processing unit may automatically run a predetermined process based on a built-in program, or may also send a command to perform a preheating process by the external remote control device. The electric thermal heater 140 is, for example, a device capable of supplying heat when being powered, and may be a sheet or a plate, which is not limited by the invention. In the embodiment, the electric thermal heater 140 is, for example, an etching electric thermal heater, a silicone electric thermal heater, a mica electric thermal heater, etc.

The image assembly 130 is coupled to and controlled by the control system 120, and is at least partially disposed in the casing 110. For example, the image assembly 130 may partially extend outside the casing 110, so as to project image beams.

The image assembly 130 includes an optical engine module 131 and a projection lens module 132. The illumination assembly 170 includes a light source, and the illumination assembly 170 provides an illumination beam IB to the optical engine module 131. The optical engine module 131 includes at least one light valve to convert the illumination beam IB into an image beam MB featuring image information, and then the image beam MB is projected to a screen or a wall by the projection lens module 132 to form an image. The optical engine module 131 is controlled by the control system 120 to output the image beam MB. As the working time of a projector 100 continues, more and more heat is generated by the light beam from the illumination assembly 170 of the projector 100, such that the heat may cause a thermal expansion of the optical engine module 131 and the projection lens module 132. The projection lens module 132 is, for example, a convex lens, located on a transmission path of the image beam MB of the optical engine module 131, and configured to converge the image beam MB. Then, the image beam MB passing through the projection lens module 132 is projected onto the screen or the wall to form an image. For example, the illumination assembly 170 includes a light source (not shown), and the light source is, for example, a plurality of laser elements (not shown), and the laser elements are, for example, arranged in an array, and the laser elements are, for example, Laser Diodes (LDs). In other embodiments, the illumination assembly 170 may also be other solid-state illumination sources, for example, a light emitting diode, a laser diode. the illumination assembly 170 may also include a high-intensity discharge lamp. The at least one light valve included in the optical engine module 131 is, for example, a Digital Micro-mirror Device (DMD) or a Liquid-Crystal-On-Silicon (LCOS) panel. However, in other embodiments, the light valve may also be a transmissive Liquid Crystal Display (LCD) panel or other spatial light modulator, which is not limited by the invention. For example, the projection lens module 132 may contain a lens used for projecting images.

In the embodiment, the number of the electric thermal heater 140 may be single or plural, and each of the electric thermal heaters 140 is coupled to and controlled by the control system 120 and disposed in the casing 110. For example, each of the electric thermal heaters 140 may be disposed adjacent to the image assembly 130, so as to transfer heat to the image assembly 130 to warm it up. For example, the electric thermal heater 140 may be disposed adjacent to the light valve of the optical engine module 131, and further the electric thermal heater 140 may be, for example, disposed to abut against and around the projection lens module 132 of the image assembly 130. In such a configuration, the temperature of the projection lens module 132 may be raised quickly. In other embodiments, the electric thermal heater 140 may be attached onto the projection lens module 132. In yet other embodiments, the electric thermal heater 140 may be disposed between the light valve of the optical engine module 131 and the projection lens module 132.

An operation process of the projector 100 is described in brief below. When or before the projector 100 starts to operate, the control system 120 may control the at least one electric thermal heater 140 to activate the at least one electric thermal heater 140, so as to preheat the image assembly 130 and warm up the image assembly 130 to a cut-off temperature. Then, the control system 120 switches off the at least one electric thermal heater 140 based on built-in instructions, so as to stop heating. The focal length of the projection lens module 132 of the image assembly 130 may then be adjusted. Moreover, by adjusting the focal length of the projection lens module 132, clarity of the image formed on the screen or the wall may be improved.

Further, the focal length of the image assembly 130 is adjusted by way of a manual focusing and/or an automatic focusing. For example, a user may input a command through the external remote control device to adjust the projection lens module 132 to output clear images to be projected onto the screen or the wall. The user may also rotate a focusing ring to adjust the focal length. On the other hand, the control system 120 may actively adjust a relative distance between the projection lens module 132 and the optical engine module 131 based on a default command, and the default command may be default or may be rewritten manually, so as to achieve a required focal length.

The at least one electric thermal heater 140 comprises a thermal sensor 141, and the thermal sensor 141 may be configured to sense a local temperature of the image assembly 130 and feed a first control signal back to the control system 120. The first control signal includes information associated with the local temperature. In this way, a temperature raising status of the image assembly 130 may be estimated.

The projector 100 further includes a temperature sensor 150 coupled to the control system 120. The temperature sensor 150 is, for example, disposed in the casing 110, and is configured to sense an overall temperature of the image assembly 130 and feed a second control signal back to the control system 120. The second control signal includes information associated with the overall temperature. In this way, a temperature raising status of the image assembly 130 may be estimated.

For example, the thermal sensor 141 and the temperature sensor 150 are, for example, commercially available electronic components adapted to convert temperature into electronic data. In an embodiment, the thermal sensor 141 and the temperature sensor 150, for example, include thermocouples, thermistors, etc., though the invention is not limited thereto.

Moreover, the projector 100 further includes a cooling assembly 160 coupled to and controlled by the control system 120. The cooling assembly 160 is configured to decrease or maintain the operating temperature of the image assembly 130 after the focal length of the image assembly 130 is adjusted. Further, the cooling assembly 160 includes a thermoelectric cooling chip, a fan, a heat pipe or a heat sink, and is disposed adjacent to the image assembly 130.

Figure 2:
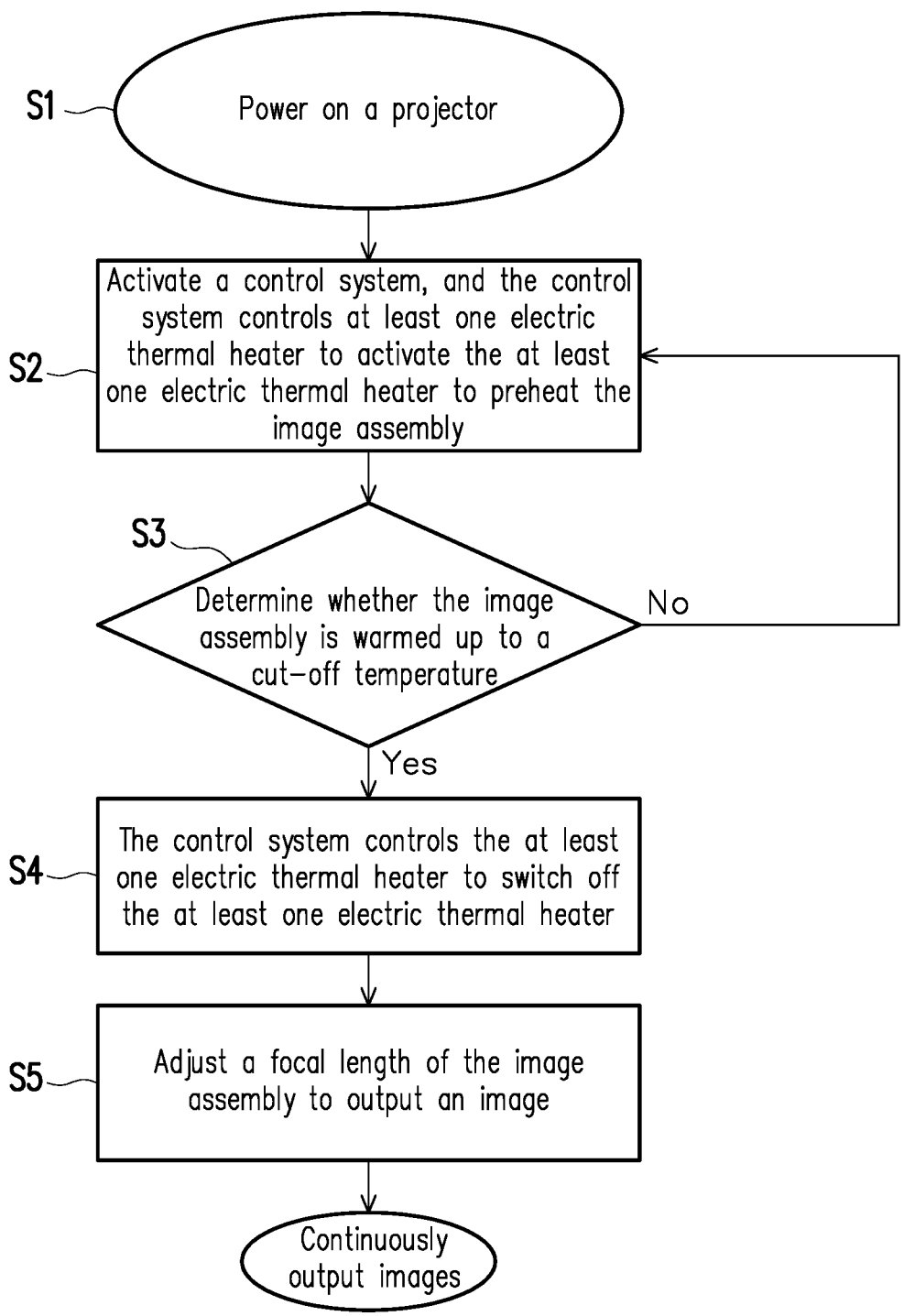
FIG. 2 is a flowchart illustrating a focal length adjusting method for a projector according to an embodiment of the invention.
Figure 3:
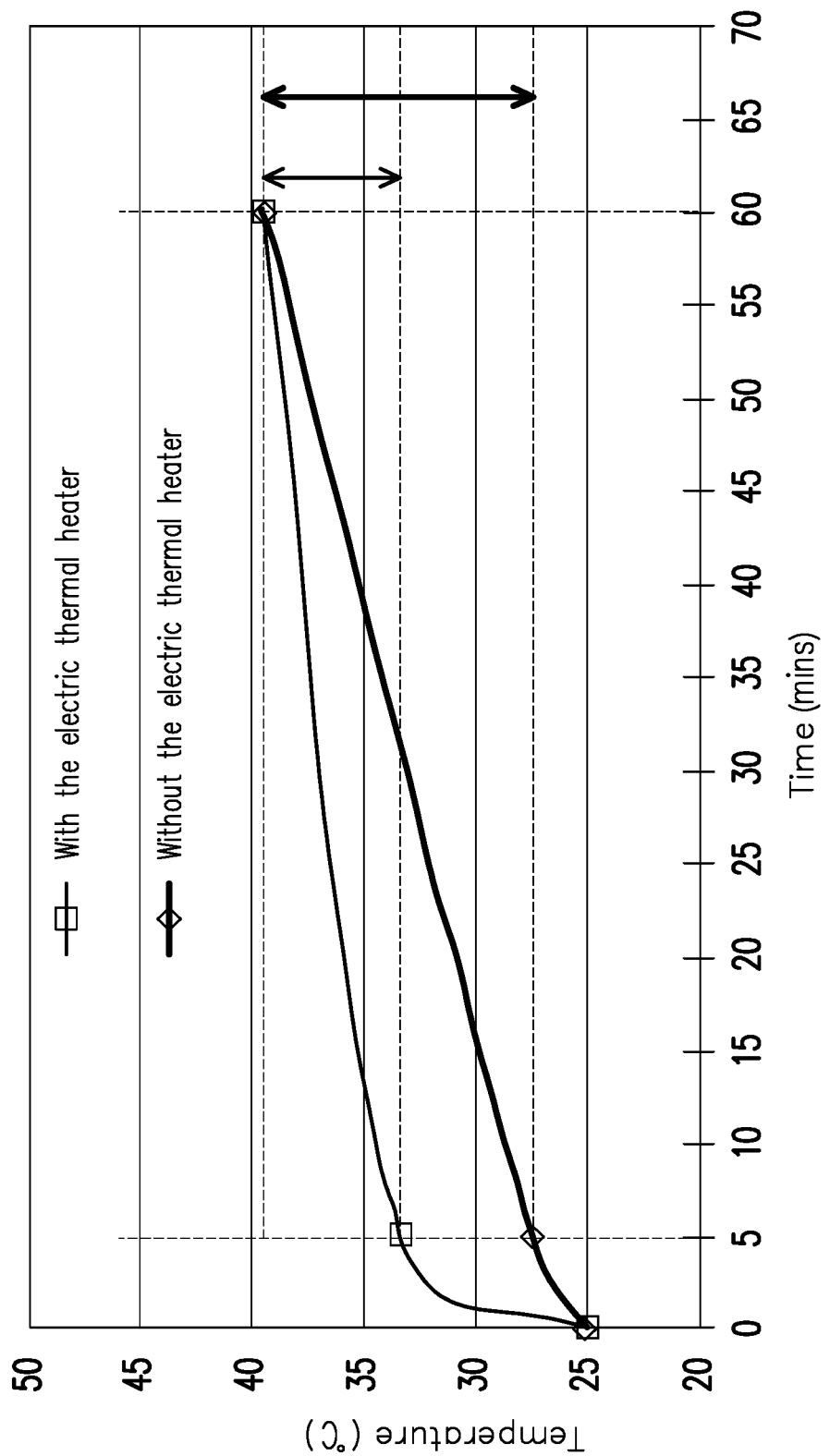
FIG. 3 is a diagram of the temperature raising processes of the projector compared to a conventional projector.

FIG. 2 is a flowchart illustrating a focal length adjusting method for a projector according to an embodiment of the invention. FIG. 3 is a diagram of the temperature raising processes of the projector compared to a conventional projector.

Referring to FIG. 2, the focal length adjusting method for the projector 100 of the invention is described in detail below. In step S1, the projector 100 is powered on. Those skilled in the art should understand that the step of "powering on the projector 100" does not specifically refer to that the projector starts to project image, but may also include a state that the power is delivered but the project has not yet projected image. In step S2, the control system 120 is activated, and the at least one electric thermal heater 140 is automatically activated based on a built-in program, so as to preheat the image assembly 130 and quickly raise the temperature of the image assembly 130 to the cut-off temperature. Then, step S3 is executed, such that the control system 120 continuously receives the first control signal and/or the second control signal fed back from the thermal sensor 141 and/or the temperature sensor 150, and determines whether the image assembly 130 is warmed up to the cut-off temperature according to the local temperature and/or the overall temperature of the image assembly 130. If a determination result that the image assembly 130 is not warmed up to the cut-off temperature is made, the image assembly 130 may be continually heated. If a determination result that the image assembly 130 is warmed up to the cut-off temperature is made, step S4 is executed. In step S4, the control system 120 automatically switches off the at least one electric thermal heater 140 to stop heating. Then, step S5 is performed, such that the focal length of the image assembly 130 is adjusted after the electric thermal heater 140 is stopped heating.

Referring to FIG. 3, in the embodiment, after the projector 100 comprising the electric thermal heater 140 is powered on, the image assembly 130 is preheated by the electric thermal heater 140 for about five minutes, and the temperature of the image assembly 130 is raised to the cut-off temperature (for example, 34° C.). The image assembly may be warmed up to reach a stable operation status, and the stable operating temperature of the image assembly 130 may be 40° C. after 60 minutes, so that the temperature change of the image assembly 130 is 6° C. from the $5^{th}$ minute to the $60^{th}$ minute.

A projector without the electric thermal heater, as a comparison, may be powered on. With the heat generated by the light source, the temperature of the image assembly thereof may be raised to the cut-off temperature (for example, 28° C.) in 5 minutes. The stable operating temperature of the image assembly may be raised to 40° C. in another 60 minutes. As such, the temperature change of the image assembly is 12° C. during the same period.

Further, both of the projector 100 of the embodiment and the existing projector may be focused after a period (for example, 5 minutes). After the projector 100 of the embodiment is warmed up to the operating temperature, compared to the temperature change (12° C.) of the existing configuration, the temperature change of the projector 100 between the cut-off temperature and the operating temperature is smaller (6° C.). The thermal expansion of the image assembly 130 caused from a large temperature change is effectively reduced or avoided, so that the focal length shift of the image assembly 130 may be mitigated. In a conventional configuration, the temperature change is 12° C., that may cause a significant thermal expansion and further a larger focal length shift, and the projected image may be blurred or unclear.

Those skilled in the art should understand that, with a limited space and positions in the projector for the electric thermal heater, the cut-off temperature may be determined according to the number, positions of the electric thermal heaters and/or other requirements. Generally, the smaller the temperature change between the cut-off temperature and the operating temperature is, the smaller temperature change the image assembly may suffer and the less thermal expansion or the focal length shift may be caused. For example, the operating temperature may be 40° C., and the temperature difference between the operating temperature and the cut-off temperature may be between 1° C. and 6° C. Namely, the cut-off temperature may be 34-39° C. In this case, the electric thermal heater may be powered up to increase the cut-off temperature of the image assembly to 39° C. in 5 minutes, so as to achieve the temperature difference of 1° C. between the operating temperature and the cut-off temperature. However, in other embodiments, a cooling assembly 160 may be disposed and the image assembly 130 may be cooled after focusing so as to reduce the operating temperature of the image assembly 130 in stable status, such that the temperature difference between the operating temperature and the cut-off temperature may be reduced. Therefore, the cut-off temperature of the invention is not limited to the 34° C., and the temperature difference between the operating temperature and the cut-off temperature is not limited to the examples of the invention.

In summary, after the projector of the invention is powered on to operate, the at least one electric thermal heater is activated to preheat the image assembly to a cut-off temperature in a short period. Then the control system switches off the at least one electric thermal heater, and the focal length of the projection lens module in the image assembly may then be adjusted in a manual or automatic manner. After the image assembly is continuously warmed up to the operating temperature, since the cut-off temperature is closer to the operating temperature of the projector compared to the configuration without the electric thermal heater and the heating is performed in advance of focusing, the image assembly may suffer a smaller temperature change from the cut-off temperature to the operating temperature than the temperature change from the room temperature to the operating temperature. Therefore, the thermal expansion of the projector may be reduced and the focal length shift caused by the thermal expansion of the projector may also be avoided. Therefore, in the invention, with the projector being warmed up to the cut-off temperature within a short period before adjusting the focal length, the projector may be readily to operate more quickly, and a waiting period before focusing is reduced. Further, a focal length shift is mitigated.

It will be apparent to those skilled in the art that various modifications and variations can be made to the disclosed embodiments without departing from the scope or spirit of the invention. In view of the foregoing, it is intended that the invention covers modifications and variations provided and they fall within the scope of the following claims and their equivalents.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
a casing;
an illumination assembly configured to emit an illumination beam;
a control system;
an image assembly, coupled to and controlled by the control system, wherein the image assembly is at least partially disposed in the casing,
wherein the image assembly comprises:
an optical engine module, located on a transmission path of the illumination beam and configured to convert the illumination beam into an image beam; and
a projection lens module, located on a transmission path of the image beam and configured to form an image, wherein the projection lens module has a focal length; and
at least one electric thermal heater, coupled to and controlled by the control system,
wherein the at least one electric thermal heater is disposed in the casing and configured to transform electrical power into heat, wherein the at least one electric thermal heater does not emit light,
wherein the control system is configured to control the at least one electric thermal heater and to automatically activate the at least one electric thermal heater, so as to preheat the projection lens module and warn up the projection lens module to a cut-off temperature after the projector is powered on, and wherein after a temperature of the projection lens module reaches the cut-off temperature, the control system is configured to switch off the at least one electric thermal heater, and then the focal length of the projection lens module preheated by the at least one electric thermal heater is adjusted,
wherein the projection lens module is configured to be continuously warmed up to a stable operating temperature after the projection lens module reaches the cut-off temperature, and wherein the cut-off temperature is lower than the stable operating temperature.

2. The projector of claim 1, wherein the at least one electric thermal heater comprises a thermal sensor configured to sense a local temperature of the image assembly and feed a first control signal back to the control system, and wherein the first control signal comprises information associated with the local temperature.

3. The projector of claim 1, further comprising:
a temperature sensor coupled to the control system and configured to sense an overall temperature of the image assembly, wherein the temperature sensor is configured to feed a second control signal back to the control system, and wherein the second control signal comprises information associated with the overall temperature.

4. The projector of claim 1, further comprising:
a cooling assembly coupled to and controlled by the control system, wherein the cooling assembly is configured to decrease or maintain an operating temperature of the image assembly after the focal length of the image assembly is adjusted.

5. The projector of claim 4, wherein the cooling assembly comprises a thermoelectric cooling chip, a fan or a heat sink, and the cooling assembly is disposed adjacent to the image assembly.

6. The projector of claim 1, wherein the focal length of the image assembly is adjusted by way of a manual focusing and/or an automatic focusing.

7. A focal length adjusting method for a projector, wherein the projector comprises an illumination assembly, a control system, an image assembly, and at least one electric thermal heater,
wherein the illumination assembly is configured to emit an illumination beam, the image assembly comprises an optical engine module and a projection lens module, the optical engine module is located on a transmission path of the illumination beam and is configured to convert the illumination beam into an image beam, and the projection lens module is located on a transmission path of the image beam and configured to form an image, wherein the projection lens module has a focal length, and wherein the focal length adjusting method for the projector comprises:
powering on the projector;
activating the control system, wherein the control system is configured to control the at least one electric thermal heater and to automatically activate the at least one electric thermal heater to preheat the projection lens module, and the at least one electric thermal heater is configured to transform electrical power into heat and does not emit light;
determining whether the projection lens module is warmed up to a cut-off temperature after the projector is powered on, wherein after the projection lens module is warmed up to the cut-off temperature, the control system is configured to switch off the at least one electric thermal heater; and
adjusting the focal length of the projection lens module preheated by the at least one electric thermal heater to output an image, wherein the projection lens module is configured to be continuously warmed up to a stable operating temperature after the projection lens module reaches the cut-off temperature, and wherein the cut-off temperature is lower than the stable operating temperature.

8. The focal length adjusting method of the projector of claim 7, wherein the projector further comprises a cooling assembly, and the cooling assembly is configured to decrease or maintain an operating temperature of the image assembly after the focal length of the image assembly is adjusted.

9. The focal length adjusting method of the projector of claim 8, wherein a temperature difference between the operating temperature and the cut-off temperature is between 1° C. and 6° C.

10. The focal length adjusting method of the projector of claim 7, wherein after the image assembly is preheated by the at least one electric thermal heater for a period, the image assembly is warmed up to the cut-off temperature.

11. The focal length adjusting method of the projector of claim 7, wherein the at least one electric thermal heater comprises a thermal sensor configured to sense a local temperature of the image assembly and feed a first control signal back to the control system, wherein the first control signal comprises information associated with the local temperature.

12. The focal length adjusting method of the projector of claim 7, wherein the projector further comprises a temperature sensor coupled to the control system, wherein the temperature sensor is configured to sense an overall temperature of the image assembly and feed a second control signal back to the control system, and wherein the second control signal comprises information associated with the overall temperature.

13. The focal length adjusting method of the projector of claim 7, wherein the image assembly comprises:
an optical engine module, configured to convert an illumination beam into an image beam; and
a projection lens module, located on a transmission path of the image beam and configured to form an image.

14. The focal length adjusting method of the projector of claim 7, wherein the focal length of the image assembly is adjusted by way of a manual focusing and/or an automatic focusing.

* * * * *